United States Patent
Righi

(10) Patent No.: US 11,963,486 B2
(45) Date of Patent: Apr. 23, 2024

(54) BLOWER

(71) Applicant: EMAK S.P.A., Bagnolo in Piano (IT)

(72) Inventor: Matteo Righi, Reggio Emilia (IT)

(73) Assignee: Emak S.P.A., Bagnolo in Piano (IT)

( * ) Notice: Subject to any disclaimer, the term of this patent is extended or adjusted under 35 U.S.C. 154(b) by 826 days.

(21) Appl. No.: 17/041,510

(22) PCT Filed: Apr. 1, 2019

(86) PCT No.: PCT/IB2019/052656
§ 371 (c)(1),
(2) Date: Sep. 25, 2020

(87) PCT Pub. No.: WO2019/207378
PCT Pub. Date: Oct. 31, 2019

(65) Prior Publication Data
US 2021/0007294 A1   Jan. 14, 2021

(30) Foreign Application Priority Data
Apr. 23, 2018  (IT) .......................... 102018000004785

(51) Int. Cl.
*A01G 20/47* (2018.01)
(52) U.S. Cl.
CPC .................................. *A01G 20/47* (2018.02)
(58) Field of Classification Search
CPC ... A47L 9/244; A47L 9/24; A47L 9/08; A47L 9/248; A47L 9/2842; A01G 20/47
USPC ........................................ 15/144.4, 405, 414
See application file for complete search history.

(56) References Cited

U.S. PATENT DOCUMENTS

| | | | | |
|---|---|---|---|---|
| 8,739,362 | B1* | 6/2014 | Conder | ..................... B08B 5/02 |
| | | | | 15/406 |
| 2013/0298345 | A1* | 11/2013 | Romito | .................. A01G 20/47 |
| | | | | 15/246 |
| 2015/0377253 | A1* | 12/2015 | Shibata | ................. F04D 25/082 |
| | | | | 415/119 |
| 2017/0042096 | A1* | 2/2017 | Bylund | ................... F04D 25/08 |
| 2018/0070536 | A1* | 3/2018 | Cooper | .................. A01G 20/47 |

FOREIGN PATENT DOCUMENTS

| | | | | |
|---|---|---|---|---|
| CN | 200978402 Y | * | 11/2007 | |
| CN | 200978402 Y | * | 11/2011 | |
| EP | 1884180 A2 | | 2/2008 | |
| GB | 2416677 A | * | 2/2006 | ............. A01G 1/125 |
| GB | 2416677 A | | 2/2006 | |

OTHER PUBLICATIONS

Echo, PAS 129 MPH 347 CFM Leaf Blower Attachment (Year: 2014).*
CN-200978402Y escapenet translation (Year: 2023).*

* cited by examiner

*Primary Examiner* — Brian D Keller
*Assistant Examiner* — Tim Brady
(74) *Attorney, Agent, or Firm* — Volpe Koenig

(57) ABSTRACT

The invention describes a blower (1) comprising: a volute (10) for conveying air, a first tube (15) connected to the conveying volute (10), a second tube (50) adapted for being at least partially inserted in the first tube (15) and for sliding inside it along a sliding direction (A), and a fixing system of the second tube (50) to the first tube (15) in at least two positions, one of which is extracted and one is retracted.

7 Claims, 5 Drawing Sheets

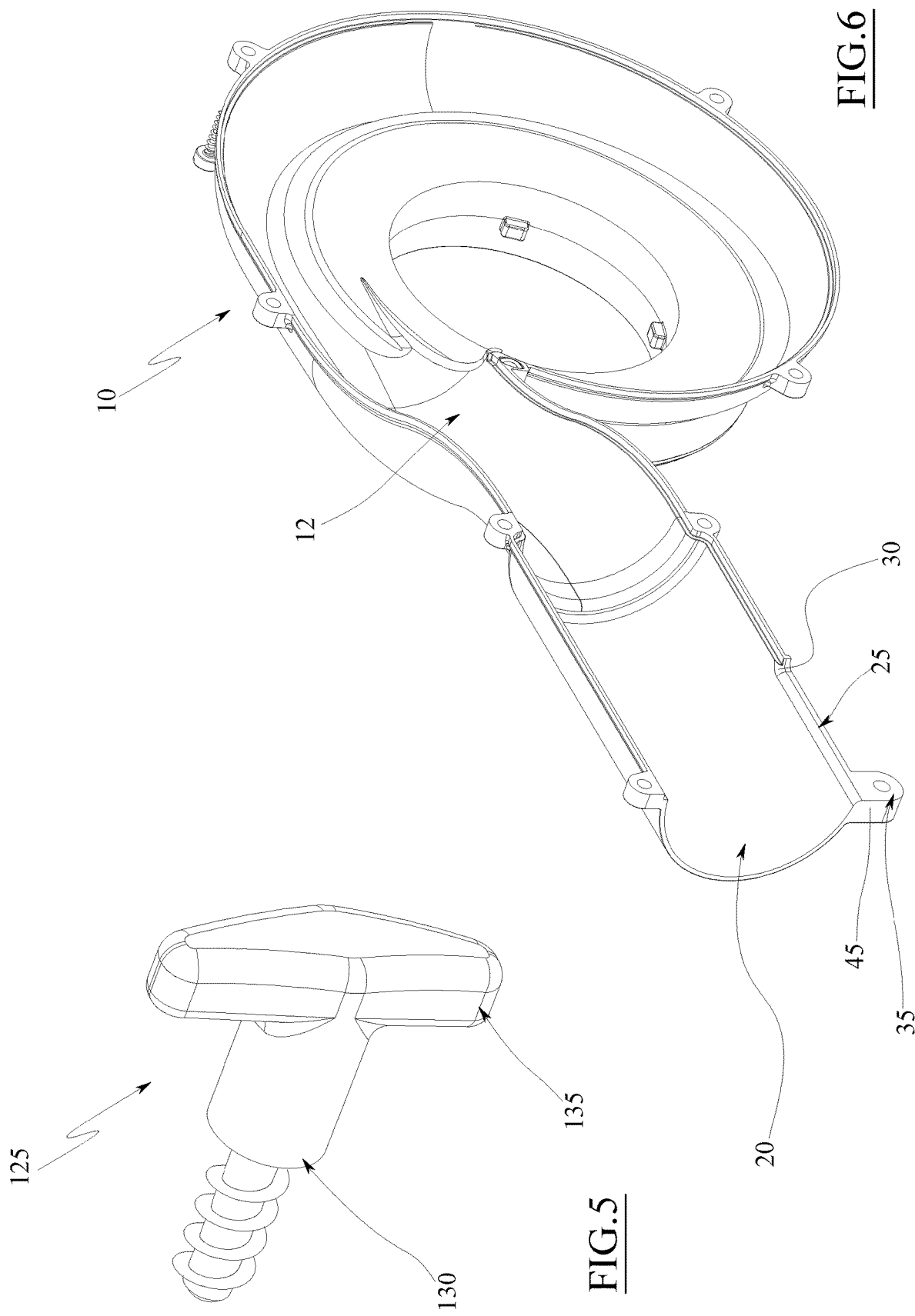

BLOWER

TECHNICAL FIELD

The present invention concerns a blower and, in particular, a blower equipped with a volute for conveying air.

STATE OF THE ART

As known, a blower is a device capable of blowing and/or sucking and shredding leaves and other debris that is deposited day after day on lawns, flowerbeds, paths and surfaces in general.

The blower generally comprises an internal combustion engine or electric motor, a lever or other element for selecting the power to be delivered, an impeller adapted for putting the air under pressure, a volute for conveying air and a tube for dispensing conveyed air.

In some cases the dispensing tube is a telescopic tube, i.e. comprising two portions, of which a first portion is fixed to the volute for conveying air and a second portion can be made to slide inside the first portion and locked with respect to it in two or more positions through fixing systems generally based on the interference between suitable surfaces of the first portion and of the second portion.

Due to this coupling, the relative position between the two portions is not particularly stable, so that it may be the case that, due to the vibrations or the impacts to which the blower is subjected during use, the length of the dispensing tube can vary in an involuntary and/or accidental manner.

Therefore, in the field there is a great need to make a fixing system of the telescopic tube that is stable and long-lasting.

SUMMARY OF THE INVENTION

A purpose of the present invention is to meet the aforementioned requirements of the field.

Another purpose is to meet such requirements with a simple, rational and relatively low-cost solution.

Such purposes and others are accomplished by the characteristics of the invention as given in independent claim 1. The dependent claims outline preferred and/or particularly advantageous aspects of the invention.

In particular, an embodiment of the present invention provides a blower comprising: a volute for conveying air, a first tube connected to the conveying volute, a second tube adapted for being at least partially inserted in the first tube and made to slide inside it along a sliding direction A, and a fixing system of the second tube to the first tube in at least two positions, one of which is extracted and one is retracted.

Thanks to such a solution it is possible to make a blower equipped with a telescopic tube that can be locked in a stable and long-lasting manner in the aforementioned extracted and retracted positions.

According to an aspect of the invention at least one portion of the first tube can be made in a single body with at least one portion of the volute.

Thanks to this solution the first tube is robust and the assembly of the blower is quicker and simpler with respect to the devices of the prior art.

Moreover, such a solution makes it possible to reduce the costs due to the production of two separate elements, making it possible to have a time saving in the manufacturing step and also in the mounting step of the blower and therefore also a saving in the assembly cost.

Another aspect of the invention foresees that the first tube can have a guide slit adapted for guiding the second tube during the sliding in the first tube and that said second tube can be provided with a fin adapted for sliding along said guide slit.

In this way the coupling between the first tube and the second tube is particularly intuitive and quick and at the same time effective, preventing the second tube from being able to rotate with respect to the first tube, about its central axis, during insertion.

According to another aspect of the invention the second tube can be made in a single piece.

Thanks to such a solution further interface surfaces are avoided, which there would be in the case of two or more parts assembled together, which could make further discontinuities and thus cause further pressure losses along the conveying channel.

Yet another aspect of the invention foresees that the first tube and the second tube can have a substantially circular section. In this way, during the conveying of air sharp edges are avoided that can act as flow-breaking areas and thus create pressure drops during the conveying of air.

A further aspect of the invention foresees that the fixing system can comprise:
- at least one first eyelet and a second eyelet spaced apart along the sliding axis of the second tube in the first tube, made on one among the first tube and the second tube,
- at least one third eyelet made on the other among the first tube and the second tube,
- a pin adapted for being simultaneously inserted in the third eyelet and in one among the first and the second eyelet.

Thanks to such a solution a fixing system is provided that is effective, long-lasting and at the same time cost-effective.

A further aspect of the invention foresees that a third eyelet can be adapted for being arranged in a position coaxial to the first eyelet when the second tube is in extracted position, whereas it is adapted for being arranged in a position coaxial to the second eyelet when the second tube is in retracted position.

In this way it is simple to position the dispensing tube in the extracted and retracted configuration.

Yet another aspect of the invention foresees that, when the second tube is in retracted position the fin can be adapted for making contact with a bottom of the guide slit.

Thanks to this characteristic, when the fin is in contact with the bottom of the guide slit the third eyelet is at, for example in a position coaxial to, the at least one second eyelet obtaining the retracted position.

Yet another aspect of the invention foresees that a threading can be associated with at least one among the first eyelet, the second eyelet and the third eyelet and that the pin can have at least one threaded portion.

The threading can be formed directly on the inner surface of the eyelet, or it can be provided by a further threaded member, for example a threaded nut, which is fixed coaxially to the eyelet.

Advantageously, the pin can thus be screwed in, once the retracted or extracted position has been obtained, thus fixing the two tubes in position with a simple and cost-effective solution.

BRIEF DESCRIPTION OF THE DRAWINGS

Further characteristics and advantages of the invention will become clear from reading the following description provided as an example and not for limiting purposes, with the help of the figures illustrated in the attached tables.

FIG. 5 is an enlarged perspective view of a pin of the blower of FIG. 4.

FIG. 6 is an enlarged view of a half-shell of the volute visible in FIG. 4.

DETAILED DESCRIPTION

Figure 1:
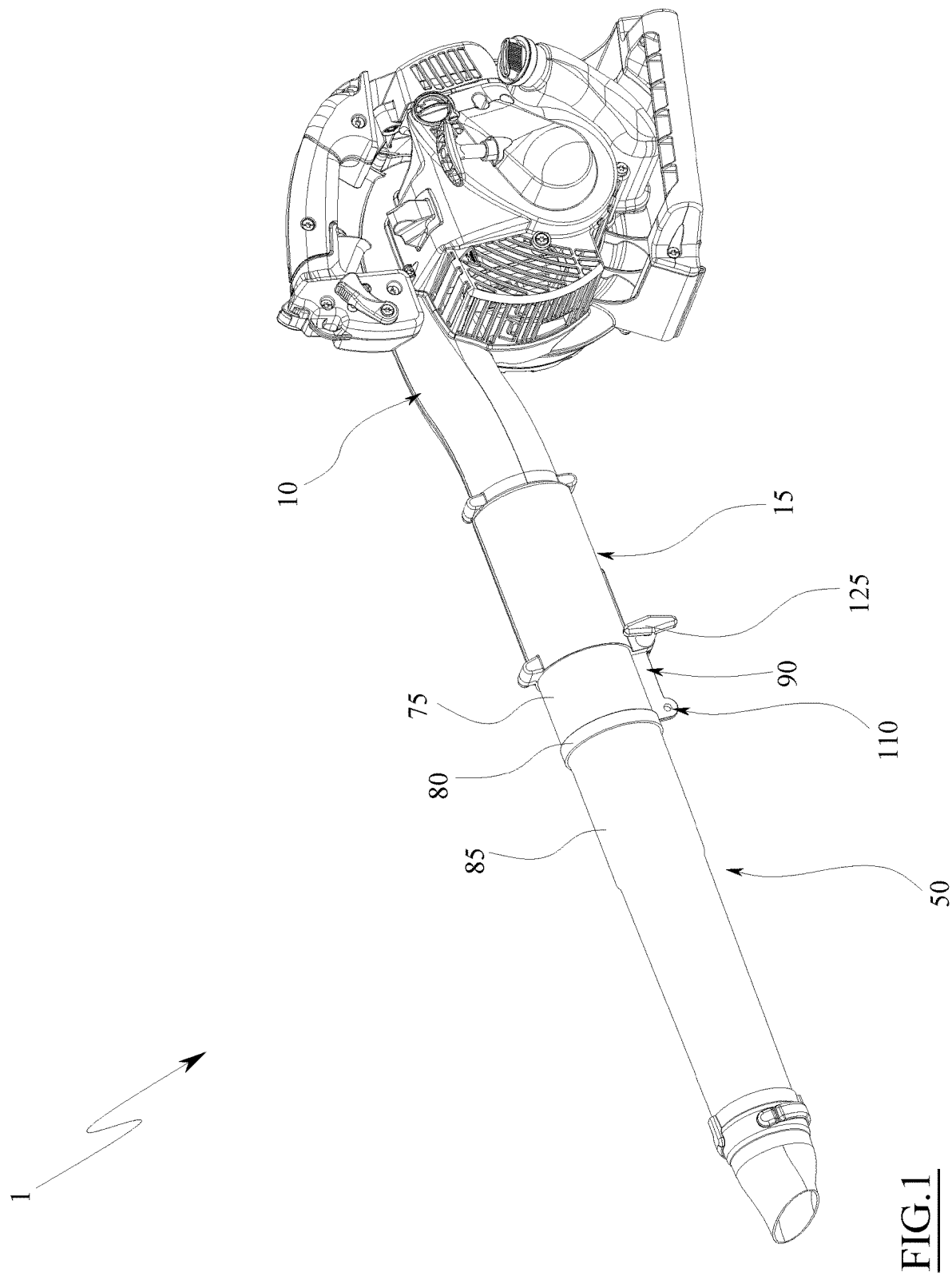
FIG. 1 is a view of a blower according to the invention in which a second tube is in an extracted position.
Figure 2:
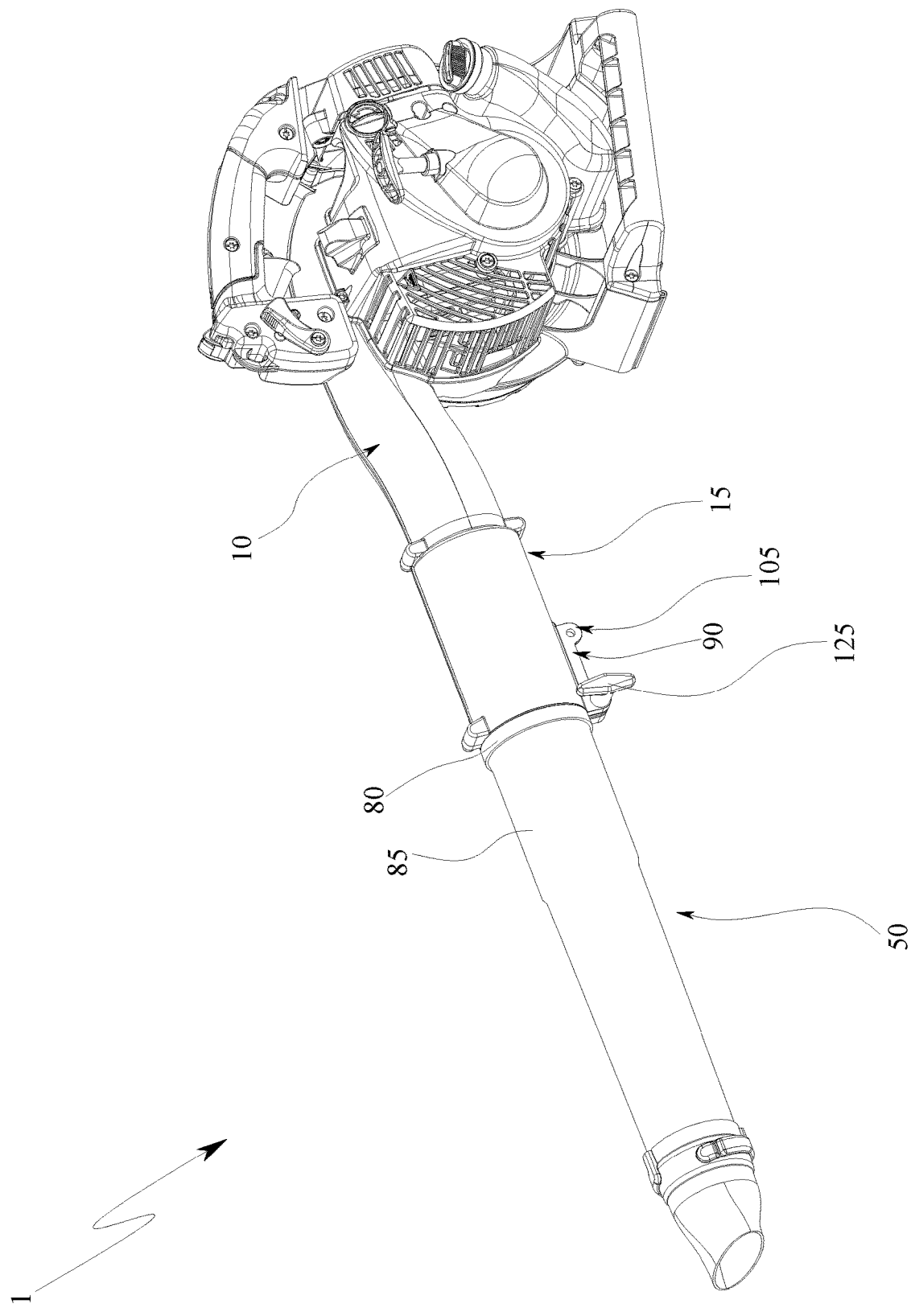
FIG. 2 is a view of the blower off FIG. 1 in which the second tube is in a retracted position.
Figure 3:
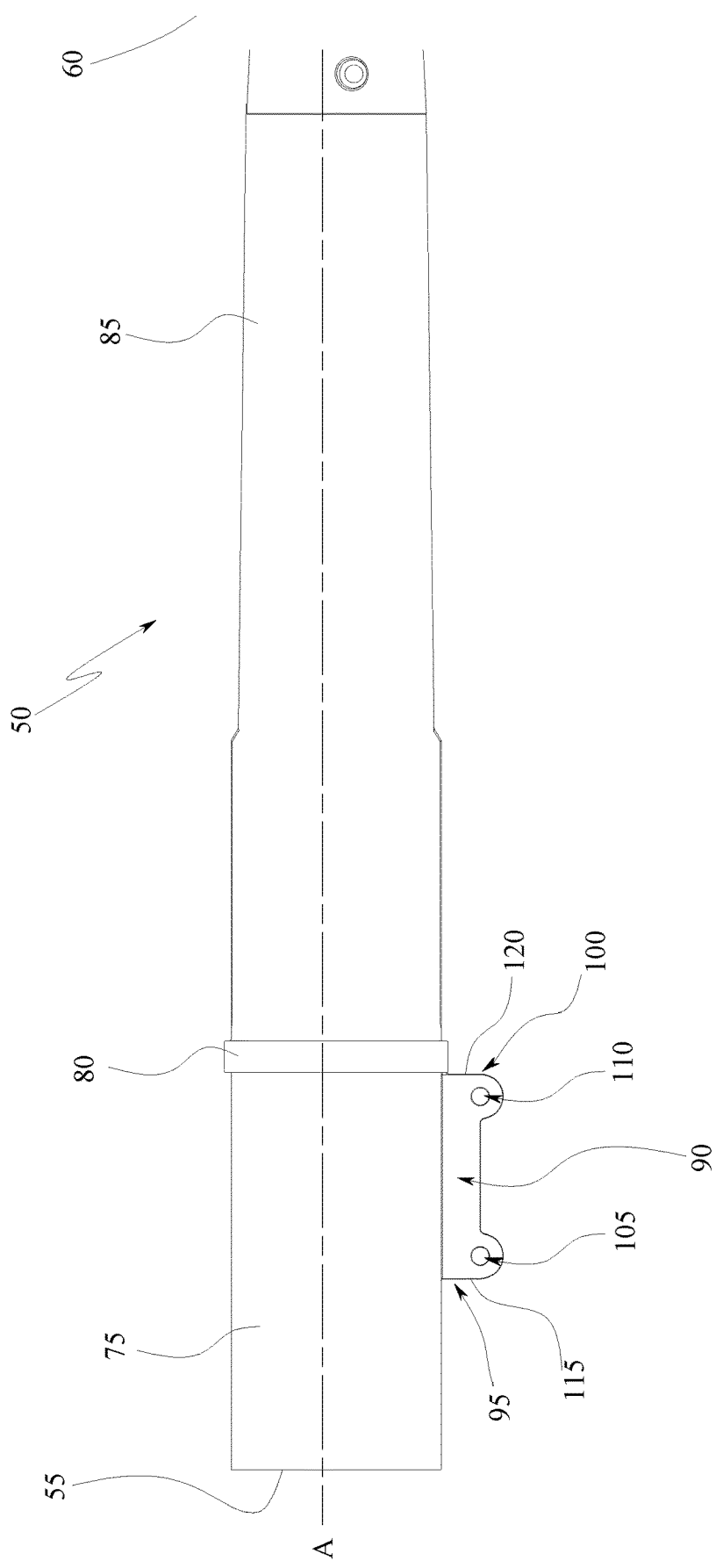
FIG. 3 is a side view of the second tube of the previous figures.
Figure 4:
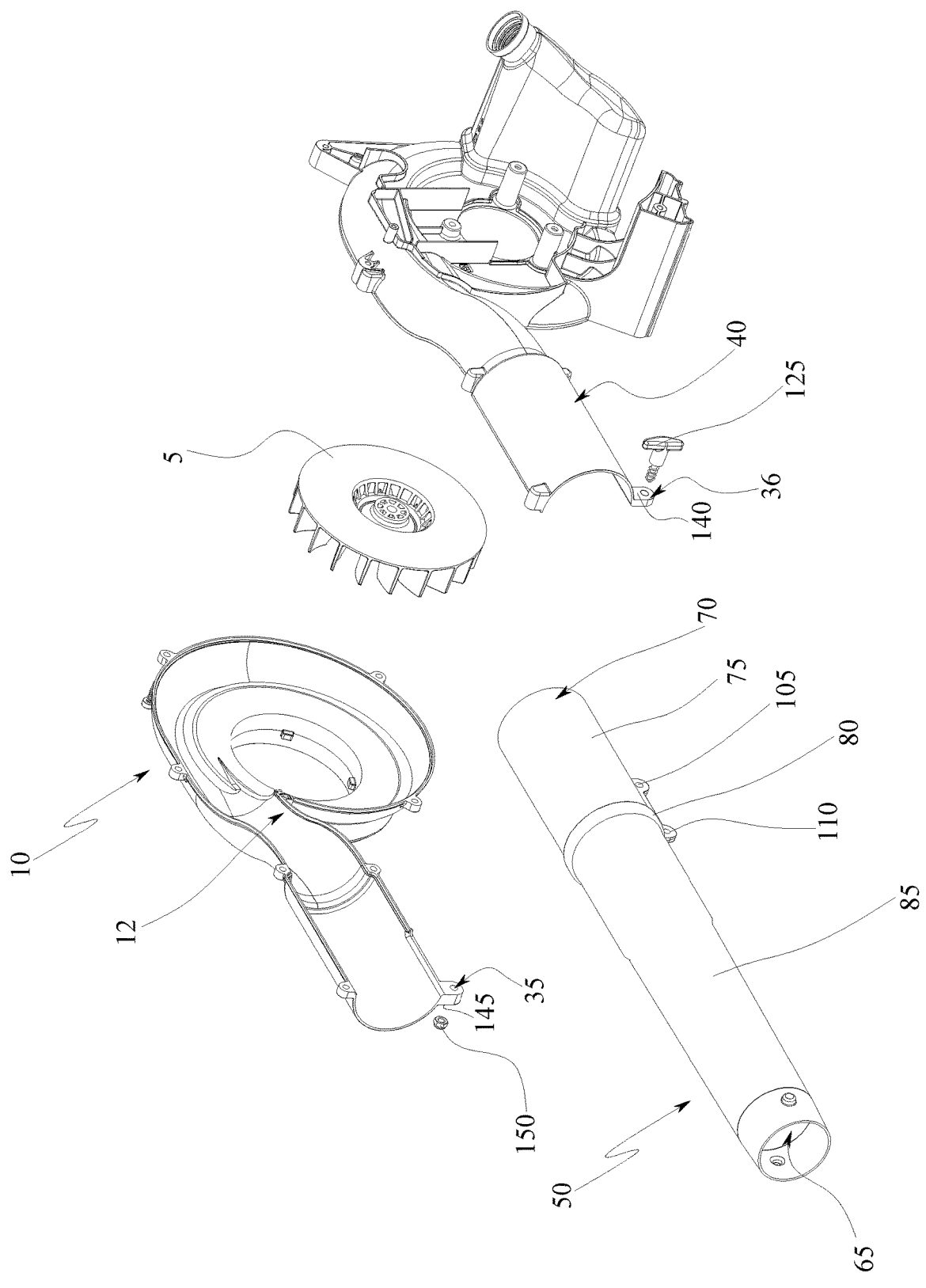
FIG. 4 is an exploded view of the blower of the previous figures.

The present invention concerns a blower and, in particular, a blower equipped with a volute for conveying air.

The blower 1 firstly comprises an internal combustion engine and a tank for feeding the engine. This does not rule out the possibility that in other embodiments it can be an electric motor and that a suitable battery power pack is thus associated with it. The engine sets an impeller 5 in rotation, said impeller being shaped substantially like a fan. The impeller 5 is collected inside the conveying volute 10 and is adapted for putting the air in compression and conveying it through said volute.

The volute 10 can consist of an internally hollow body, for example a shell or casing, adapted for containing the impeller 5 and with which the impeller is rotatably associated with respect to a rotation axis.

The body of the volute 10 has, for example, two mutually opposite side flanks, a first flank of which can be constrained to the engine and to the respective tank (or battery pack) and a second flank of which can be free.

The body of the volute 10 can also comprise a perimeter band with substantially circular extension. The perimeter band is closed at the side by the aforementioned flanks, so as to delimit a passage chamber for the air shaped substantially like a disc inside it.

In particular, the perimeter band can have a rounded wall-shaped profile, and can be joined with the side flanks, so that the inner surfaces of the casing are globally sinuous and continuous, i.e. substantially free from edges.

The volute 10 also comprises, for example in the second side flank, a hole with central axis perpendicular to the side flanks, communicating with the outside of the blower and with the function of supplying air towards the impeller. The volute 10 can also have an outlet duct 12, which branches from and opens onto the perimeter band, and has its axis substantially perpendicular, but not coplanar, to the axis of curvature of the latter.

Said outlet duct 12 can be delimited by a cylindrical side wall and can have a generatrix tangent, or almost tangent, to the perimeter band itself, i.e. the duct is directed tangentially or almost tangentially with respect to the perimeter band, so as to convey the air in a substantially tangential direction with respect to the latter.

The blower 1 also comprises a first tube 15 connected to the volute 10 and fixed thereto. In particular, the first tube 15 can be connected as a continuation of the outlet duct 12, so as to be in communication with the inner volume of the volute. The first tube 15 can, for example, be made in a single body with the volute itself.

In some embodiments the volute 10 is produced in two half-shells. These two half-shells can be obtained by ideally cutting the volute 10 along a section plane perpendicular to the axis of curvature of the perimeter band and containing the axis of the outlet duct 12. In this case the outlet duct 12 and the first tube 15 will also be made in two half-tubes and each half-tube is made in a single body with the corresponding half-shell.

The first tube 15 can, for example, have a substantially circular section. Said first tube 15 comprises an inlet mouth 20 and can have a guide slit 25 communicating with the inner volume of the first tube 15, said guide slit 25 extending, for example, from the inlet mouth 20 of the first tube 15 in the direction of extension of the length of the tube itself and equipped with a bottom 30. The guide slit 25 can have a substantially rectangular shape in plan and be substantially symmetrical with respect to a mid-plane of the first tube 15.

The blower 1 can also comprise a second tube 50. The second tube 50 has a first end 55 and an opposite second end 60. The second tube 50 also has an inner surface 65 and an outer surface 70 and can have, for example, a substantially circular section along the entire extension from the first end 55 to the opposite second end 60. The second tube 50 is for example formed from a first portion 75 adapted for being inserted inside the first tube 15, a second portion 80 coaxial to the first and having, for example, a greater outer diameter than the first portion 75, and a third portion 85 coaxial to the first two, the diameter of which can be in a first segment, proximal to the second portion 80, substantially equal to that of the first portion 75 and gradually decreasing up to the second end 60 of the second tube 50. For example, the outer diameter of the first portion 75 of said second tube 50 is substantially equal to the inner diameter of the first tube 15. The second tube 50 is adapted for being inserted, with low clearance, at least partially inside the first tube 15 and for sliding inside the first tube itself along a sliding direction A between a first extracted position and a second retracted position.

This does not rule out the possibility that in other embodiments the first tube 15 and the second tube 50 can have a prismatic section and that a prismatic coupling is made between them.

In the illustrated embodiment the second tube 50 is inserted inside the first tube 15 and can be made to slide between an extracted position where the first portion 75 of the second tube 50 is only partially inserted in the first tube 15, and a retracted position where said first portion 75 of the second tube 50 is totally inserted in the first tube 15.

On the outer surface 65 of the first portion 75 of the second tube 50 it is possible to make a fin 90. Said fin 90 extends along the direction of extension of the length of the second tube 50, and has an initial segment 95 and an end segment 100. The fin 90 is adapted for sliding inside the guide slit 25 of the first tube 15 and can have a thickness substantially equal to the width of the guide slit 25 made on the first tube 15, i.e. a width such as to be received with low clearance inside the slit itself.

The blower 1 also comprises a fixing system of the second tube 50 to the first tube 15. The fixing system can comprise at least one first eyelet 105 and a second eyelet 110 spaced apart along the sliding direction A of the second tube 50 in the first tube 15, made on the second tube 50, for example in a single body with the latter.

In particular, the first eyelet 105 and the second eyelet 110 can be made at the opposite ends of the fin 90 of the second tube 50 so that an edge 115 of the first eyelet 105 defines the initial segment 95 of the fin 90 and so that the opposite edge 120 of the second eyelet defines the end segment 100 of the fin 90.

The first eyelet 105 and the second eyelet 110 define through holes the central axes of which are, for example, parallel to one another and substantially perpendicular to the sliding direction A of the second tube 50 in the first tube 15.

The distance between the two central axes of the first eyelet 105 and of the second eyelet 110 can be comprised between 50 mm and 100 mm, for example equal to 60 mm.

The fixing system can also comprise a pair of eyelets made on the first tube 15.

In particular, in the illustrated embodiment the fixing system comprises a pair of eyelets, each defining a through hole, including a third eyelet 35 and a fourth eyelet 36, which are made on opposite sides with respect to the guide slit 25 of the first tube 15. The third eyelet 35 and the fourth eyelet 36 of the pair of eyelets can be coaxial to one another, and also extend, for example, on a plane perpendicular to the inlet mouth 20, and project from the outer surface 40 of the first tube 15, said pair of eyelets being able to be made in a single body with the first tube 15. In particular, an edge 45 of each eyelet of the pair of eyelets can be substantially flush with the plane on which the inlet mouth 20 of the first tube 15 is made.

In this way, following the sliding of the second tube 50 with respect to the first tube 15, in a first configuration the first eyelet 105 of the second tube 50 can be brought to the third eyelet 35 and the fourth eyelet 36 made on the first tube 15, i.e. in a position coaxial to them, placing the first tube 15 and the second tube 50 in extracted position. By making the fin 90 slide further inside the guide slit 25 of the first tube 15, the edge 115 of the first eyelet 105 goes into contact with the bottom 30 of the guide slit 25, in this configuration the second eyelet 110 of the second tube 50 is at the third eyelet 35 and the fourth eyelet 36 made on the first tube 15, i.e. in a position coaxial to them, and the first tube 15 and the second tube 50 are in retracted position.

In practice, in the illustrated embodiment the guide slit 25 has a length equal to the distance between an edge 115 of the first eyelet 105 and the opposite edge 120 of the second eyelet 110 made on the second tube 50, i.e. substantially equal to the length of the fin 90.

The fixing system of the blower 1 can also comprise a pin 125 adapted for being inserted in the third eyelet 35 and in the fourth eyelet 36 made on the first tube 15 and alternatively in one among the first eyelet 105 and the second eyelet 110 made on the second tube 50, through the respective through holes. The pin 125 can comprise a first portion 130 and a second portion 135. The first portion 130 can, for example, extend for a length at least equal to the distance between the face 140 of the third eyelet 35 and the opposite face 145 of the fourth eyelet 36 made on the first tube 15. Said first portion 130 can also be at least partially, or completely, threaded. The second portion 135 of the pin 125 has an elongated shape in a single direction perpendicular to a longitudinal axis of the first portion 130 and is shaped like a handle.

In order to allow the pin to be locked, the third eyelet 35 can be coaxially associated with a threaded nut adapted for coupling with the first portion 130. This does not rule out the possibility that in other embodiments the fixing can take place through a means simply inserted in an interlocking manner between the eyelets or other.

Nor does this rule out the possibility that in other embodiments the nut 150 can be replaced by an inner threading made directly in the third eyelet and/or that the nut 150 (or the threading) is associated with (made on) the first, second or fourth eyelet.

In use, the operation of the blower according to the invention is as follows: the second tube 50 is thus inserted in the first tube 15 through the inlet mouth 20 so that the fin 90 inserts in the slit 25 and is made to slide along the sliding direction A until the first eyelet 105 made on the fin 90 goes to, i.e. in coaxial position to, the third eyelet 35 and the fourth eyelet 36 made on the first tube 15 made on the first tube 15. In this configuration the extracted position is obtained. At this point, the pin 125 is inserted and screwed, through the suitable threading made on the first portion 130 of said pin, to the nut 150 associated with the fourth eyelet 36 made on the first tube 15, obtaining the fixing of the second tube 50 to the first tube 15. In a second step the second tube 50 is inserted in the first tube 15 so that the fin 90 inserts in the slit 25 and is made to slide until the fin 90 comes into contact with the bottom 30 of the guide slit 25. At this point, the second eyelet 110 made on the fin 90 is at the third eyelet 35 and the fourth eyelet 36 made on the first tube 15, i.e. coaxial to them. In this configuration the retracted position is obtained. The pin 125 is thus inserted and screwed through the suitable threading made on the first portion 130 of said pin to the nut 150 associated with the fourth eyelet 36 obtaining the fixing of the first tube 15 to the second tube 50.

In other embodiments the fourth eyelet 36 may not be present and the fixing can be carried out by inserting the pin 125 simultaneously in the third eyelet 35 and one among the first eyelet 105 and the second eyelet 110 respectively for the extracted and retracted position.

According to another embodiment (not illustrated) the fin of the second tube 50 could be equipped with a single eyelet whereas at least two pairs of mutually coaxial eyelets are made on the first tube 15 on opposite sides of the guide slit 25.

The invention thus conceived can undergo numerous modifications and variants all of which are encompassed by the inventive concept.

Moreover, all of the details can be replaced by other technically equivalent elements.

In practice, the materials used, as well as the contingent shapes and sizes, can be whatever according to the requirements without for this reason departing from the scope of protection of the following claims.

The invention claimed is:

1. A blower (1) comprising:
a volute (10) for conveying air,
a first tube (15) connected to the volute (10) for conveying,
a second tube (50) adapted for being at least partially inserted in the first tube (15) and slidable therein along a sliding direction (A), and
a fixing system of the second tube (50) to the first tube (15) in at least two different positions along the sliding direction (A) one of which is extracted and one is retracted, wherein said fixing system of the second tube (50) to the first tube (15) comprises:
at least one first eyelet (105) and a second eyelet (110) spaced apart along the sliding direction (A) of the second tube (50) in the first tube (15), made on one among the first tube (15) and the second tube (50),
at least one third eyelet (35) made on the other among the first (15) and the second tube (50), and
a pin (125) adapted for being inserted simultaneously in the third eyelet and in one among the first (105) and the second eyelet (110), wherein the third eyelet (35) is adapted to be arranged in a position coaxial with the first eyelet (105) when the second tube (50) is in the extracted position, and adapted to be arranged in a position coaxial with the second eyelet (110) when the second tube (50) is in the retracted position.

2. The blower (1) according to claim 1, wherein at least one portion of the first tube (15) is made in a single body with at least one portion of the volute (10).

3. The blower (1) according to claim 1, wherein the second tube (50) is made in a single piece.

4. The blower (1) according to claim 1, wherein the first tube (15) and the second tube (50) have a substantially circular section.

5. The blower (1) according to claim 1, wherein a threading is associated with at least one of: the first eyelet (105), the second eyelet (110) or the third eyelet (35); and wherein the pin (125) has at least one threaded portion.

6. The blower (1) according to claim 1, wherein the first tube (15) comprises a guide slit (25) and the second tube (50) comprises a fin (90) adapted to slide along the guide slit (25).

7. The blower (1) according to claim 6, wherein when the second tube (50) is in a retracted position, the fin (90) is adapted to make contact with a bottom of the guide slit (25).

\* \* \* \* \*